May 3, 1927. 1,627,334

G. M. LITTLE ET AL

DRY CELL

Filed Dec. 21, 1923

WITNESSES:
Carl J. Loesch
W. C. Wheeler.

INVENTOR
George M. Little
James G. Ford
BY
Wesley G. Carr
ATTORNEY

Patented May 3, 1927.

1,627,334

UNITED STATES PATENT OFFICE.

GEORGE M. LITTLE, OF PITTSBURGH, AND JAMES G. FORD, OF WILKINSBURG, PENNSYLVANIA, ASSIGNORS TO WESTINGHOUSE ELECTRIC & MANUFACTURING COMPANY, A CORPORATION OF PENNSYLVANIA.

DRY CELL.

Application filed December 21, 1923. Serial No. 682,072.

Our invention relates to primary cells and particularly to those of the type known as dry cells.

In dry cells it is desirable to provide means by which the cells may be stored a reasonable length of time without losing their electrical properties as, otherwise, the cells deteriorate rapidly when not in use. It is also desirable, for obvious electrical reasons, to provide cells which have low internal resistance.

One object of our invention is, therefore, to provide a cell which shall not deteriorate rapidly when it is not in use.

Another object of our invention is to provide a cell which shall have a low internal resistance.

Another object is to provide multiple and well distributed connections between the zinc electrode and the terminal so that the terminal will continue to function when the zinc becomes severed or weakened by corrosion at a point near the top of the cell, where chemical action is most rapid.

Still another object of our invention is to provide a cell which shall be compact and which may be conveniently moved from place to place.

In the ordinary zinc-carbon dry cell, the zinc electrode is the container. Inside of the zinc-electrode is a paper lining containing the carbon, depolarizer and electrolyte. It is known that these cells deteriorate somewhat when not in use. It is also known that the internal resistance usually is high because of imperfect contact between the zinc, the porous paper or cloth separator and the material containing the depolarizer.

The deterioration of dry cells may be prevented, to a considerable degree, by utilizing amalgamated zinc containers, but, when that is done, the soldered-on terminals drop off after a short time and the containers become very brittle and weak.

It is also known that the high resistance may be lessened by an intimate contact between the zinc, the porous paper or cloth separator and the depolarizer material, but the ordinary type of dry cell does not provide efficiently for this pressure.

Our structure provides a cell of low internal resistance and one which has a long life when not in use. It also provides terminal connections which are practically permanent.

Specifically, we provide a rigid core or brick comprising the electrolyte and a depolarizer. The carbon electrode is embedded in the center of this brick. The zinc electrode surrounds this core, and is held tightly against it by means of a binder.

Figure 1:
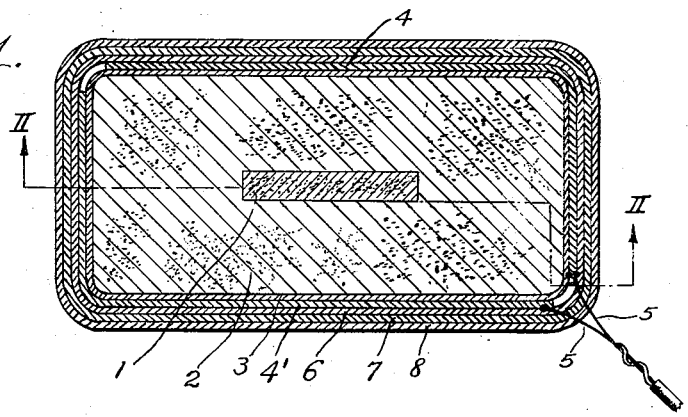
Figure 2:
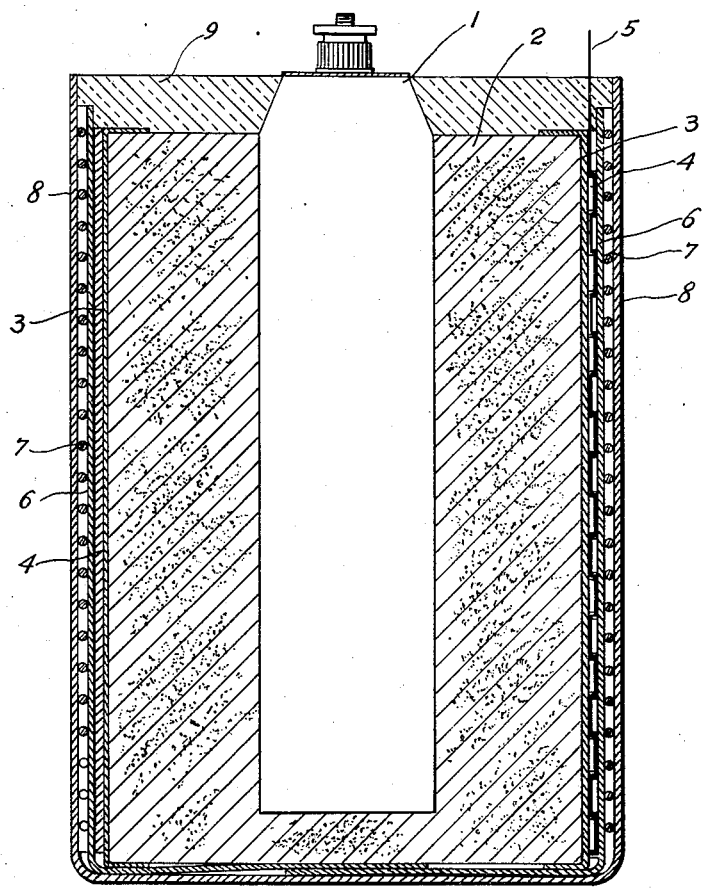

In the drawing constituting a part hereof and in which like characters designate like parts, Figure 1 is a horizontal cross-sectional view of our cell and Fig. 2 is a cross-sectional view taken along the line II—II of Figure 1.

Referring to Fig. 1, the carbon electrode 1 in the center of the cell is surrounded by a core or brick 2 which comprises the electrolyte and the depolarizer. The core 2 constitutes a rigid frame work which supports the cell.

A layer of starched paper 3 is wrapped around the sides of the brick 2 and extends over a part of the top and bottom of the brick. Amalgamated angular zinc electrodes 4 and 4' surround the core except for short spaces at two of the diagonal corners. Each of the amalgamated electrodes is composed of L-shape strips of zinc. Terminal conductors 5 for the two zinc electrodes are twisted together to form a single terminal.

In order to avoid the use of solder, each electrode terminal consists of an amalgamated copper wire 5 which is threaded in and out through holes in the zinc strips to securely fasten the terminals to the zinc electrodes and form a perfect contact at the bottom, as well as at the middle and top. The amalgamated electrode is next wrapped tightly with a layer of tarred paper 6, which, in turn, is wrapped tightly by means of a string 7, or an equivalent binder, in order to maintain a high pressure on the electrode and core. Finally, a waterproof insulating material 8, such as another layer of tarred paper, is wrapped on the outside. A wax seal 9 completes the enclosure.

It will be noted that we have provided a cell with a rigid frame member comprising an electrolyte and a depolarizer. Amalgamated zinc is used in order to prevent deterioration of the cell when it is not in use. Means are also provided to maintain an intimate contact between the zinc electrode, the porous partition and the depolarizer, which decreases the internal resistance. Another means is provided whereby the terminal conductors are connected to the zinc without the use of solder, thereby insuring multiple permanent connections which will not be destroyed, even though the zinc be eaten away at the top of the cell.

Although we have described a specific embodiment of our invention, we do not limit it thereto since various modifications thereof will suggest themselves to those skilled in the art, without departing from the spirit of our invention, the scope of which is defined in the annexed claims.

We claim as our invention:

1. In a primary cell, a rigid core member, comprising an electrolyte and a depolarizer, an electrode embedded in the core member, an electrode surrounding the core member and means for maintaining uniform pressure on all sides of the core.

2. In a primary cell, a rigid core member comprising an electrolyte and a depolarizer, an electrode embedded in the core member, an electrode surrounding the core member and means for maintaining uniform pressure on the external electrode and the core.

3. In a primary cell, a rigid core member comprising an electrolyte and a depolarizer, an electrode embedded in the core member, an electrode external to, and partly surrounding, the core member, said electrode comprising a plurality of parts, and means for maintaining a uniform pressure on all sides of the external electrode and the core.

4. In a primary cell, a rigid core member comprising an electrolyte and a depolarizer, an electrode embedded in the core member, an electrode external to, and partly surrounding, the core member, a porous partition between the core member and the external electrode and means for maintaining pressure on all sides of the external electrode and the core.

5. In a primary cell, a rigid core member comprising an electrolyte and a depolarizer, an electrode embedded in the core member, an electrode external to, and partly surrounding, the core member, said electrode comprising a plurality of parts, a porous partition between the core member and the external electrode and means for maintaining pressure on all sides of the external electrode and the core.

6. In a primary cell, a rigid core member comprising an electrolyte and a depolarizer, an electrode embedded in the core member, an electrode external to and partly surrounding, the core member, a terminal conductor having a plurality of contacts with the external electrode, and means for maintaining pressure on all sides of the external electrode and the core.

7. In a primary cell, a rigid core member comprising an electrolyte and a depolarizer, an electrode embedded in the core member, an electrode external to, and partly surrounding the core member, said core member comprising a plurality of parts, a terminal conductor having a plurality of contacts with the external electrolyte, and means for maintaining pressure on all sides of the external electrode and the core.

8. In a primary cell, a rigid core member comprising an electrolyte and a depolarizer, an electrode embedded in the core member, an amalgamated electrode external to, and partly surrounding, said core member, a porous partition between the external electrode and the core member and means for maintaining pressure on all sides of the external electrode and the core member.

9. In a primary cell, a rigid core member comprising an electrolyte and a depolarizer, an electrode embedded in the core member, an amalgamated electrode external to, and partly surrounding, said core member, a terminal conductor having a plurality of contacts with the external electrode and means for maintaining pressure on all sides of the external electrode and the core.

10. In a primary cell, a rigid core member comprising an electrolyte and a depolarizer, an electrode embedded in the core member, an amalgamated electrode external to, and partly surrounding, the core member, said electrode comprising a plurality of L-shape bars, a porous partition between the core member and external electrode and means for maintaining pressure on all sides of the external electrode and the core.

11. In a primary cell, a rigid core member comprising an electrolyte and a depolarizer, an electrode embedded in the core member, amalgamated electrodes external to and partly surrounding the core member, said electrode comprising a plurality of L-shape bars, a porous partition enclosing the core member, tension means wrapped over the external electrodes for maintaining pressure on the external electrodes and the core, and a waterproof insulator enclosing the cell.

12. The method of forming a cell which comprises making a rigid core of an electrolyte and a depolarizer, placing an electrode around said core and maintaining pressure on all sides of said electrode and said core.

13. The method of forming a cell which comprises making a rigid core of an electrolyte and a depolarizer, enclosing said core in a porous material, placing an amalgamated electrode in contact with said porous material and maintaining pressure on all sides of said electrode and said core.

14. The method of forming a cell which comprises making a rigid core of an electrolyte and a depolarizer, enclosing said core in a porous material, placing an amalgamated electrode in contact with said porous material, forming a plurality of contacts between said core and a terminal conductor, and maintaining pressure on said electrode, core and terminal conductor.

15. The method of forming a cell which comprises making a rigid core of an electrolyte and a depolarizer enclosing said core in a porous material, placing an amalgamated electrode in contact with, and around, said porous material, forming a plurality of contacts between said core and a terminal conductor, maintaining pressure on said terminal conductor, electrodes and core and enclosing the cell in a watertight insulator.

In testimony whereof, we have hereunto subscribed our names this 17th day of December, 1923.

GEORGE M. LITTLE.
JAMES G. FORD.